United States Patent [19]
McLagan

[11] Patent Number: 5,964,849
[45] Date of Patent: Oct. 12, 1999

[54] CONTROLLING VIDEO DEVICES

[75] Inventor: Neil Stuart McLagan, Bristol, United Kingdom

[73] Assignees: Sony Corporation, Tokyo, Japan; Sony United Kingdom Limited, Weybridge, United Kingdom

[21] Appl. No.: 08/825,593

[22] Filed: Apr. 1, 1997

[51] Int. Cl.[6] .................................................. G06F 13/00
[52] U.S. Cl. ................... 710/5; 709/200; 713/400
[58] Field of Search ..................... 395/821, 822, 395/823, 824, 825, 2.14, 559; 364/900; 710/5; 709/200, 201, 208, 212; 713/400, 502

[56] References Cited

U.S. PATENT DOCUMENTS

| | | | |
|---|---|---|---|
| 4,698,770 | 10/1987 | Rattan et al. | 364/900 |
| 5,077,552 | 12/1991 | Abbate | 340/825.25 |
| 5,506,932 | 4/1996 | Holmes et al. | 395/2.14 |
| 5,644,355 | 7/1997 | Koz et al. | 348/17 |
| 5,668,601 | 9/1997 | Okada et al. | 348/423 |
| 5,748,842 | 5/1998 | Holmes et al. | 395/2.79 |
| 5,867,692 | 2/1999 | Bhandari et al. | 713/400 |

*Primary Examiner*—Joseph E. Palys
*Assistant Examiner*—Abu Hossain
*Attorney, Agent, or Firm*—Frommer Lawerence & Haug, LLP.; William S. Frommer

[57] ABSTRACT

Disclosed is an apparatus for controlling video devices by transmitting RS-422 command strings to the devices comprising, a controller for preparing each RS-422 command string in advance of an execution time at which the command is to be executed; a buffer for storing each RS-422 command string and a respective associated time of execution; and a buffer scanner operable to compare a current time with the execution times of each buffered command and to transmit to the respective video device any commands stored in the buffer for which the associated execution time is the same as or before the current time.

9 Claims, 2 Drawing Sheets

CONTROLLING VIDEO DEVICES

BACKGROUND OF THE INVENTION

1. Field of the Invention

This invention relates to controlling video devices.

2. Description of the Prior Art

It has been proposed that multiple video devices—for example, video tape recorders (VTRs), switchers and so on—be controlled by computer. One way in which this can be done is for the computer to issue so-called RS-422 commands to the video devices using the established RS-422 control interfaces and protocols.

However, in a complex system, it may be necessary to issue RS-422 commands simultaneously to several devices. As well as the requirement for issuing the commands simultaneously, a more onerous requirement is that the commands often have to be timed to an accuracy of a fraction of a field or frame period with respect to an external source of video syncs (synchronisation pulses).

Present day computers are often standard PC-compatible general purpose computers, operating under a multitasking operating system such as the Microsoft Windows NT operating system or the so-called QNX operating system. These operating systems allow message-driven multitasking between multiple concurrent processing tasks, which provides efficient use of the computer's processing capacity. However, this does mean that the time at which a particular operation takes place is not generally predictable to the accuracy of a fraction of a video field period required for issuing control RS-422 commands to the controlled video devices.

Thus, there are two apparently conflicting requirements: one is that the control commands have to be issued at very precise times, and the other is that an efficient multitasking arrangement leads to an uncertainty over the exact time at which a processing operation (such as the issue of an RS-422 command) will be performed by the computer.

SUMMARY OF THE INVENTION

This invention provides apparatus for controlling video devices by transmitting RS-422 command strings to the devices, the apparatus comprising:

a controller for preparing each RS-422 command string in advance of an execution time at which the command is to be executed;

a buffer for storing each RS-422 command string and a respective associated time of execution; and a buffer scanner operable to compare a current time with the execution times of each buffered command and to transmit to the respective video device any commands stored in the buffer for which the associated execution time is the same as or before the current time.

The invention recognises and addresses the problems described above, by providing for the RS-422 commands to be generated in advance and then buffered. A relatively short process within, for example, a control computer (which can be interrupt-driven) can then issue the commands at the correct time from the buffer.

The invention also provides a method of controlling video devices by transmitting RS-422 command strings to the devices, the method comprising the steps of:

preparing each RS-422 command string in advance of an execution time at which the command is to be executed;

buffering each RS-422 command string and a respective associated time of execution;

scanning the buffered commands to compare a current time with the execution times of each buffered command; and transmitting to the respective video device any commands stored in the buffer for which the associated execution time is the same as or before the current time.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
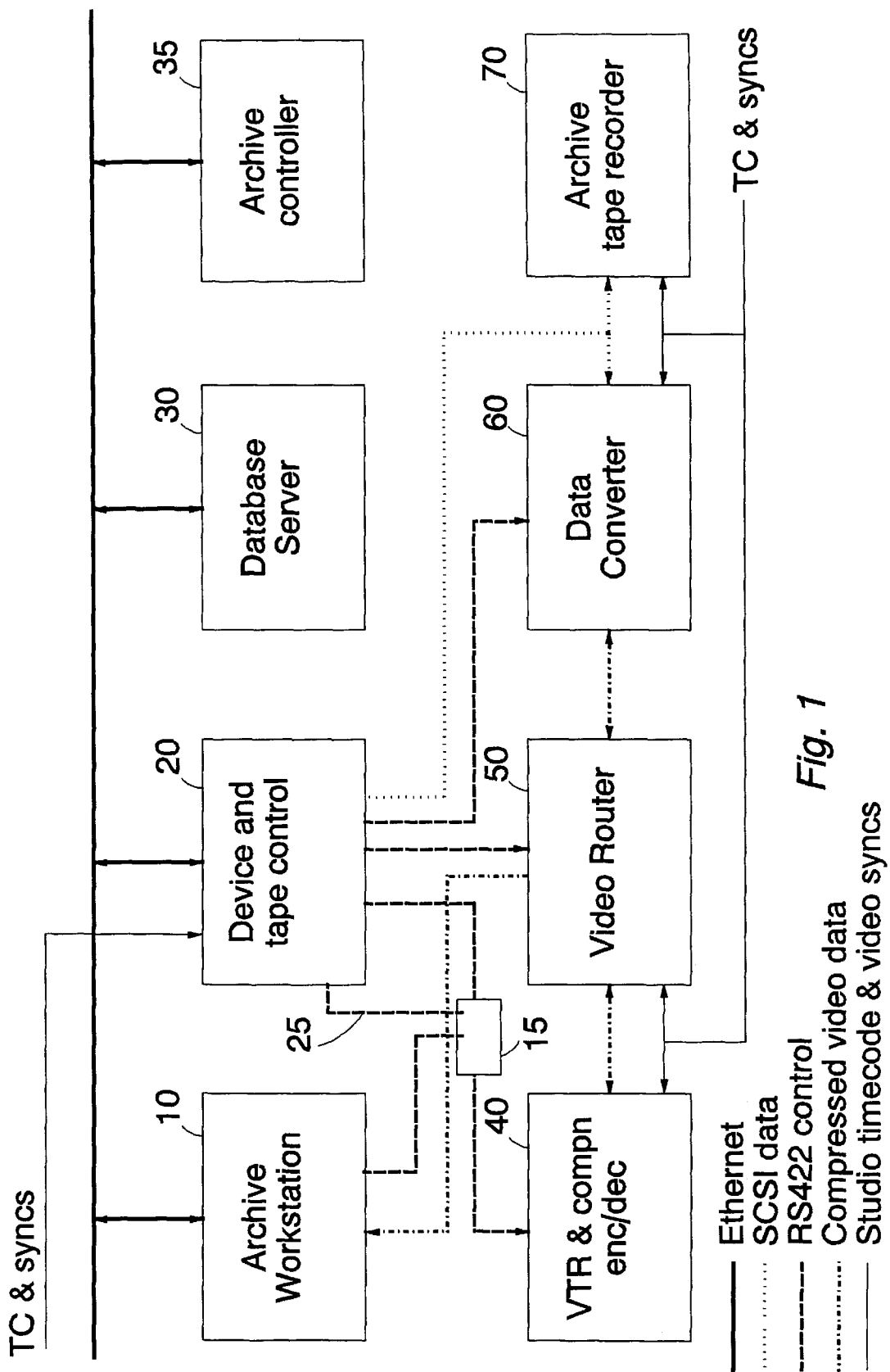
FIG. 1 is a schematic diagram of a video archiving system.

FIG. 1 is a schematic diagram of a video archiving system.

The system comprises an archive workstation 10, a device and tape control computer 20, a database server 30 and an archive controller 35, all linked by an ethernet local area network (LAN) connection, an RS-422 router 15, a video tape recorder (VTR) 40, a video (and audio) router 50, a data converter 60 and an archive tape recorder 70.

The archive controller 35 controls and coordinates the overall operation of the device and tape controller 20, and communicates with the database server (to consult or modify the database held on that server) and with the archive workstation (to receive commands).

The database server holds a database of the archived material (see below). The device and tape controller 20 responds to commands issued by the archive controller to generate specific RS-422 or SCSI commands to drive the controlled devices 40, 50, 60, 70 (and possibly other similar devices—not shown).

The RS-422 router is operable to route RS-422 commands to the VTR from either the device and tape controller 20 or the archive workstation 10.

Finally, each archive workstation is available for use by a human archivist in preparing material for archive and corresponding entries in the database. The archive workstations are in effect the "client", in that they communicate high level archiving tasks to the archive controller, which then schedules and carries out those tasks—e.g. by instructing the device and tape controller 20.

The archiving system works in two main modes of operation. When incoming video material (with or without accompanying audio material) is to be archived, the material is replayed from the VTR 40 and viewed at the archive workstation 10. A human operator (referred to as the archivist) then assigns a title, various keywords, an abstract and other information to the video material. This additional information forms a database entry which is stored in a database maintained on the database server 30. In the meantime, the video material is stored on the archive tape recorder 70. This "archive creation" process will be described in more detail below.

In a second ("archive retrieval") process, the human operator uses the archive workstation 10 (or another workstation connected to the network) to browse through the database entries held on the database server 30. For example, the user might be searching for video material having a particular associated keyword. When the user finds one or more pieces of video material in this manner which he believes are appropriate to the current requirements, he can schedule a retrieval operation to retrieve that video material from the archive tape recorder.

These two processes will now be described in more detail.

Archive Creation

In this mode of operation, incoming video material is replayed from the VTR (for example, a Sony Digital Beta-Cam video tape recorder) and is encoded into a known compressed video format (the so-called MPEG II 4:2:2 P@ML format). The compressed video is supplied in a known data transmission format known as "SDDI" via the router 50 to the archive workstation 10, where it can be viewed by the archivist.

At this archive creation stage, the routing applied by the video router 50 is controlled by the device and tape control computer 20, which in turn responds to commands by the archive workstation 10. However, for rapid control by the human operator, the RS-422 commands which control the VTR 40 are routed, via the RS-422 router, directly from the archive workstation 10 to the VTR 40. So, as a first step, the device and tape controller 20 uses an RS-422 control line 25 to set up the RS-422 router to patch RS-422 commands from the archive workstation to the VTR, and from then on during the archive creation process the commands are passed directly. Thus, if the archivist wishes to replay a particular portion of the tape, he makes the appropriate commands at the archive workstation 10, which are communicated via RS-422 router to the VTR 40 using a conventional RS-422 control protocol.

The archivist replays through the material to be archived, perhaps several times over to gain a full understanding and familiarity with the events covered by the video material. The archivist is presented with software-generated database entry forms on the screen of the archive workstation 10, at which the archivist can enter information to be used in classifying that video material. This information forms a database entry to be added to a conventional database maintained on the database server 30.

When the database entry has been prepared, the video material is transferred from the VTR 40, via the router 50 to the data converter 60. In doing this, the archive controller instructs the device and tape controller to set up the relevant devices, including setting up the RS-422 router now to route RS-422 commands from the device and tape controller to that VTR, and then to issue the necessary operating commands to set the VTR into play mode and the archive tape recorder into a record mode. The data converter 60 receives the video data in the SDDI synchronous transmission format and outputs the video data to the archive tape recorder 70 in a SCSI data transfer format.

Because the nature of the SCSI transmission format does not tend to allow data transfer operations to be initiated and started quickly enough for a synchronous video data transfer, the data converter 60 contains a large buffer memory (not shown) to provide any necessary delay to the data being passed to or from the data converter 60.

The archive tape recorder itself is a helical scan digital tape recorder such as the Sony GY10 tape recorder. This device is primarily a "data" recorder, and so will accept data other than video data, but it is noted that in this embodiment the bulk of the material stored on the archive tape recorder is in fact video data.

The video data and certain other data is then recorded on the archive tape recorder 70. Specifically, the video data is routed as described above from the VTR 40, via the router 50 to the data converter 60 and finally to the archive tape recorder 70; and the other associated data (e.g data derived from the database entry for that material) is routed from the database server 30 to the device and tape controller 20 via the LAN, and then from the device controller 20 to the archive tape recorder 70 via the SCSI link.

In a typical application, there is a very large amount of video data to be archived in this way, so a robotic library system may be used in associated with the archive tape recorder 70. In any event, whether a robotic or a manual library system is used, it is very likely that a large number of tapes will be required, and so the database entry for the video material archived on a particular tape (which is stored in the database server 30) also contains a tape identifier which identifies the appropriate tape (or tapes, if multiple copies are made) on which that material is stored.

Archive Retrieval

The first step in an archive retrieval operation is to identify the appropriate piece of video material to be retrieved. The user can do this by browsing through the database stored on the database server 30 from a computer workstation (such as the archive workstation 10) connected via the ethernet link to the database server 30. This searching mechanism may be conventional, using key words, title information or abstract text to search for a required piece of video material.

Once the required material has been identified, the user can issue a command which is transmitted via the ethernet link to the archive controller, which in turn issues a command to the device and tape control computer 20 to retrieve the required video data from the archive tape recorder 70. Again, executing these commands will include setting up the SCSI link between the archive tape recorder and the data converter, setting up the RS-422 links between the other devices, and issuing correctly timed commands to initiate play and record modes of the devices.

In general, in a typical system these commands will have to be queued by the archive controller and then initiated and executed in a priority order.

When a command is executed to retrieve data from the archive tape recorder, it is first necessary to have the correct tape placed in the archive tape recorder 70 (e.g. by the robotic library system—not shown). Then, the device and tape control computer 20 sets up the SCSI link from the archive tape recorder to the data converter and issues appropriate RS-422 commands to the data converter, the router and the VTRs 40 so that the video data is replayed from the archive tape recorder 70, communicated via the SCSI link to the data converter 60, converted into an SDDI synchronous transmission format, and then supplied via the router 50 to the VTR 40 for recording. The material can then be viewed, either during this process or later from the VTR, at one of the computer workstations.

Thus, in the example operation described above, it may be necessary to issue RS-422 commands simultaneously to the data converter, the router and to the VTRs. As well as the requirement for issuing the commands simultaneously, a more onerous requirement is that the commands often have to be timed at sub-field accuracy with respect to an external source of video syncs. This requirement can arise during an archive creation process when an incoming video signal from another part of the studio is to be archived, or during an archive retrieval process when an archived section of video material has to be retrieved at a particular time for recording or transmission elsewhere in the studio.

The servers and controllers (i.e. the device and tape controller 20, the database server 30 and the archive controller 35) used in the apparatus of FIG. 1 are standard PC-compatible general purpose computers, operating under the Microsoft Windows NT operating system (for the database server 30 and the archive controller 35) or the QNX real-time operating system available from the QSSL company (for the device and tape controller 20). These operating systems allow message-driven multitasking within each server between multiple concurrent processing tasks, which provides efficient use of the server's processing capacity. However, this does mean that the time at which a particular operation takes place is not generally predictable to the accuracy of a fraction of a video frame period required for issuing control commands to the controlled video devices 40, 50, 60.

Figure 2:
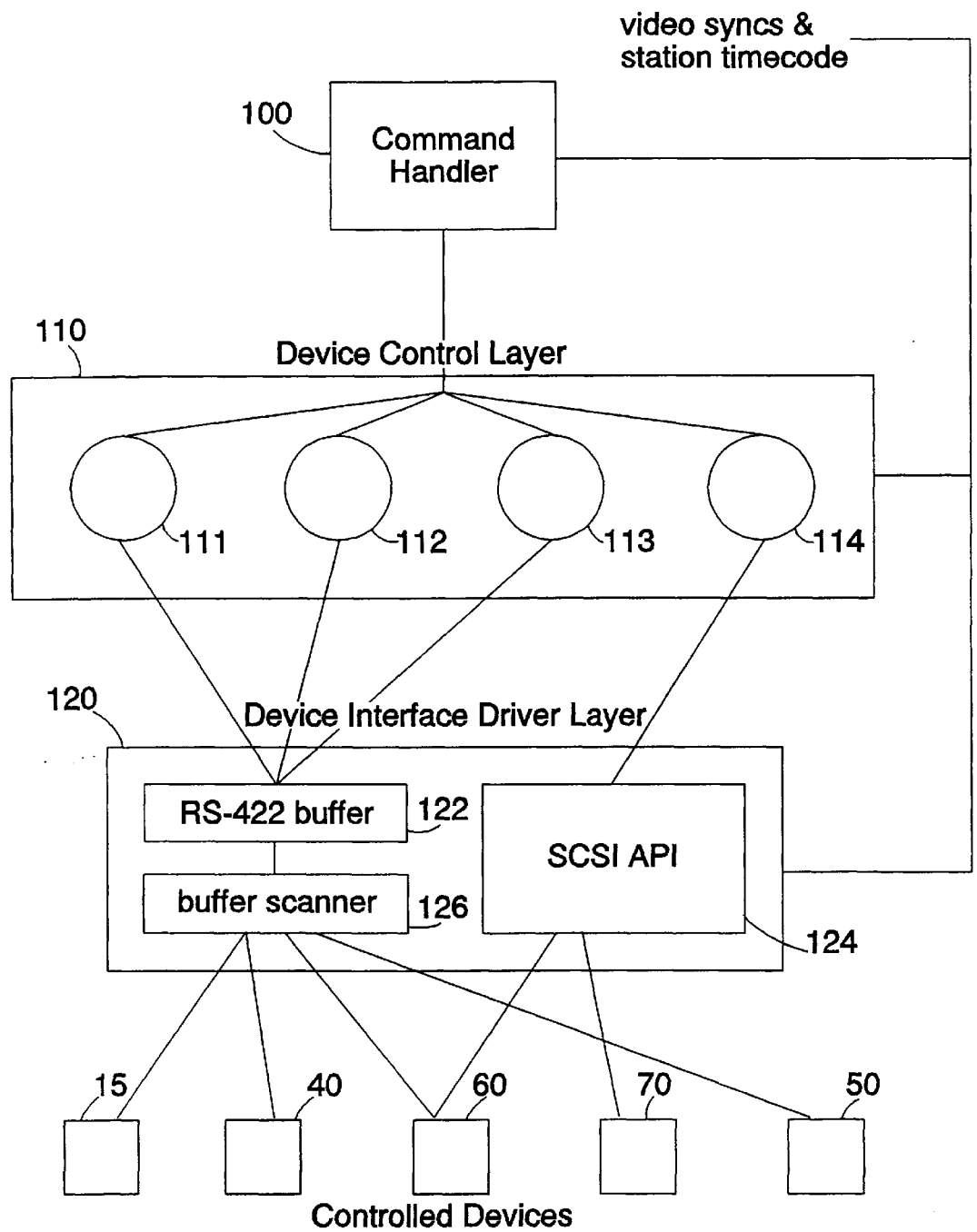
FIG. 2 is a schematic diagram showing the structure of a device and archive controller.

FIG. 2 is a schematic illustration of the control structure within the device and tape controller 20 which provides a solution to this problem.

The structure shown in FIG. 2 comprises three main intercommunicating software "layers".

A command handler layer 100 processes video handling commands received via the ethernet link from the archive controller server. These commands are in a generic format, so the command handler layer translates them (from a look-up table or similar—not shown) into specific commands for the controlled devices.

A device control layer 110 receives the device-specific commands from the command handler layer. A respective sub-controller process 111, 112, 113, 114 for each controlled device then processes that command into a string of RS-422 command words and/or (for the archive tape recorder 70 and the data converter 60) a set of SCSI commands. The sub-controllers then transmit the RS-422 commands to an RS-422 buffer 122 in a device interface driver layer 120, and the SCSI commands to a SCSI API controller 124.

The RS-422 commands are prepared by the sub-controllers in advance of the time at which they are scheduled to take place, to allow for the slight unpredictability of the execution time of the different processes involved in each processing layer caused by the use of a multitasking operating system. For example, on average the RS-422 commands might be prepared at least 5 video frames ahead of the time they are required.

As mentioned above, each RS-422 command for controlling one of the video devices 40, 50, 60 has an associated time at which that command must be executed. Therefore, along with the command itself, the RS-422 buffer 122 stores the associated operation time for each buffered command. An example of two entries in the RS-422 buffer is given in the following table. The right-hand column of the table gives the meaning of the command to assist the reader, but this information would not of course be stored in that form in the RS-422 buffer. "FF" in the execution time means a two-digit field counter.

| Code | Time of execution (HH:MM:SS:FF) | Meaning of code (not stored in buffer) |
|---|---|---|
| 0x20,01, <checksum> | 12:23:45:13 | VTR play |
| 0x20,00, <checksum> | 12:24:03:12 | VTR stop |

To distinguish between multiple devices of the same type connected to the system, a device identifier (not shown in the table above) is also associated with each entry.

The way in which these buffer entries are handled will now be described.

The video syncs and station (studio) timecode signals received by the device and tape controller are combined to give a timecode signal accurate to a fraction of the nearest field (normal timecode is frame-accurate, and the video syncs distinguish between the two fields of each frame with very high accuracy over the timing of the field transitions). This is supplied as a data signal to the command handler 100 and the device control layer 110, but is supplied as a low-level interrupt to operate a buffer scanning process in the device interface driver layer 120.

So, at each field, the processor is interrupted and is made to execute the buffer scanning process 126. This process scans all entries held in the RS-422 buffer 122 and compares the "execution time" for each entry with the current time. If any entries match the current timecode, then those entries are transmitted onto the respective video device substantially immediately, e.g. within a few microseconds or at leat less than 1 millisecond (typical RS-422 controlled video devices require the commands to be delivered to a timing accuracy of 4 to 6 milliseconds).

The scanning process operates at each video field, and because it is a low level interrupt (in fact, the highest priority system interrupt is used for the scanning process), it takes effect substantially immediately, regardless of whatever else the processor was handling.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for controlling video devices by transmitting RS-422 command strings to said devices, said apparatus comprising:

(i) a controller for preparing each RS-422 command string in advance of an execution time at which said command is to be executed;

(ii) a buffer for storing each RS-422 command string and a respective associated time of execution; and (iii) a buffer scanner operable to compare a current time with said execution times of each buffered command and to transmit to the respective video device any commands stored in said buffer for which said associated execution time is the same as or before the current time.

2. Apparatus according to claim 1, in which the current time is defined by a video timecode and/or synchronisation signal supplied to or generated by said apparatus.

3. Apparatus according to claim 2, in which:

said apparatus comprises at least one processing device capable of temporarily ceasing a current processing task and executing an interrupt processing task in response to an interrupt signal; and the operation of said buffer scanner is controlled or executed by said processing device in response to a periodic interrupt signal.

4. Apparatus according to claim 3, in which said periodic interrupt signal is arranged to cause said interrupt processing task to be executed at least once per video frame period of said video timecode signal.

5. Apparatus according to claim 3, in which said processing device is capable of being interrupted by at least two interrupt signals arranged in a hierarchy of interrupt priority, the highest priority interrupt signal being used to control or execute the operation of said buffer scanner.

6. Apparatus according to claim 4, in which said periodic interrupt signal is arranged to cause said interrupt processing task to be executed at least once per video field period of said video timecode signal.

7. Apparatus according to claim 4, in which said processing device is capable of being interrupted by at least two interrupt signals arranged in a hierarchy of interrupt priority, the highest priority interrupt signal being used to control or execute the operation of said buffer scanner.

8. Apparatus according to claim 6, in which said processing device is capable of being interrupted by at least two interrupt signals arranged in a hierarchy of interrupt priority, the highest priority interrupt signal being used to control or execute the operation of said buffer scanner.

9. A method of controlling video devices by transmitting RS-422 command strings to said devices, said method comprising the steps of:
  (i) preparing each RS-422 command string in advance of an execution time at which said command is to be executed;
  (ii) buffering each RS-422 command string and a respective associated time of execution;
  (iii) scanning said buffered commands to compare a current time with said execution times of each buffered command; and
  (iv) transmitting to said respective video device any commands stored in said buffer for which said associated execution time is the same as or before the current time.

* * * * *